Oct. 15, 1929.
H. C. BLOOMINGDALE
SIGN
Re. 17,463
Original Filed July 28, 1926
Fig. 1
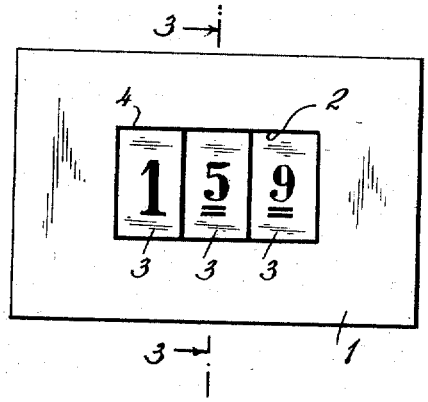
Fig. 2,
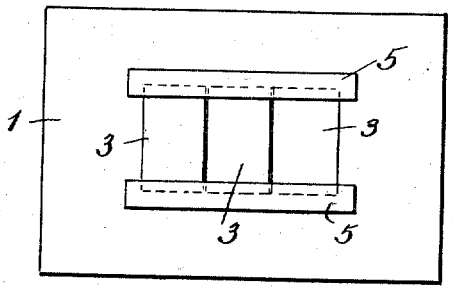
Fig. 3,
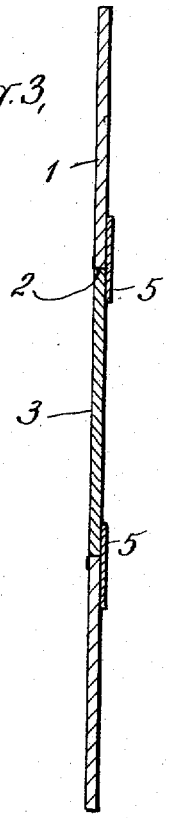
Fig. 5,
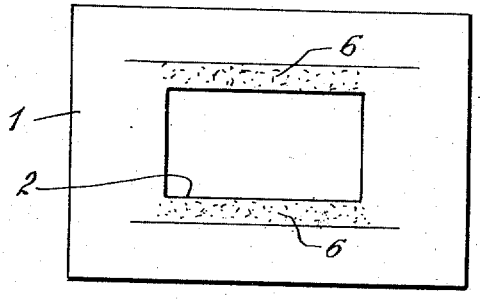
Fig. 4
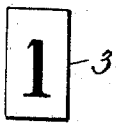
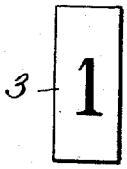
Fig. 6
INVENTOR
Hiram C. Bloomingdale
BY
Peter Dillenbeck
ATTORNEY

BEST AVAILABLE COPY

Reissued Oct. 15, 1929 Re. 17,463

UNITED STATES PATENT OFFICE

HIRAM C. BLOOMINGDALE, OF NEW YORK, N. Y., ASSIGNOR TO CARD DISPLAY, INC., OF NEW YORK, N. Y., A CORPORATION OF NEW YORK

SIGN

Original No. 1,653,033, dated December 20, 1927, Serial No. 125,366, filed July 28, 1926. Application for reissue filed May 2, 1929. Serial No. 359,985.

This invention relates to improvements in signs, and more particularly to price signs such as are used in department stores and other places.

Department stores require a large number of price signs because of the great variety of articles they handle and the different prices at which the various articles are sold. In the large stores this necessitates the employment of a force of skilled sign-makers who paint the signs by hand as required. By reason of the variation in the prices of the articles it is impractical to keep in stock a supply of printed price signs suitable for all requirements. Because of the fact that the signs are now generally painted by hand they lack uniformity in appearance which gives a somewhat disagreeable impression on walking through the various departments of the store.

My invention has for its object the provision of price signs that can be readily made up from uniform stock parts by unskilled persons. The invention enables a store to keep the parts in a small space at a convenient point and to give them out to the various departments upon requisition where they can be made up by employees of the departments as needed.

While I have pointed out the advantages of my invention for large stores, it will be appreciated that it is equally advantageous for small stores and shops. It is also to be understood that the signs may be used for other purposes than displaying prices.

In the accompanying drawings, in which are shown one or more of various possible embodiments of the several features of the invention:

Fig. 1 is a front view of one of my improved price signs;

Fig. 2 is a rear view thereof;

Fig. 3 is a section on the line 3—3 of Fig. 1;

Fig. 4 is a front view of one of the price cards detached from the frame;

Fig. 5 is a rear view of a modified frame member, and

Fig. 6 is a modification of the price card.

Referring now to the drawings, the sign comprises a frame member 1 made of a flat piece of card-board or other suitable material having its central portion cut away and removed to provide an opening 2, which opening is of suitable size and form to receive the cards or tiles 3. The cards 3 are each printed or marked with a numeral, character or other desired indicia, and are so formed that they fit into the opening 2, but, preferably, with a slight space between adjacent cards, as indicated in Fig. 1. By making the combined width of the cards slightly less than the width of the opening 2, I find that the cards can be easily inserted in the opening of the frame and that the likelihood of their warping is minimized.

The frame 1 is provided with a marking 4 that surrounds the edge of the opening 2 and is of a color that contrasts with the color of the frame. For example, where a white frame is used I prefer to have the marking 4 black. I have found that the provision of this marking gives an optical effect which tends to conceal the spacing between the cards 3 that otherwise would be noticeable.

The cards 3 are all uniform in size and shape, and they may be arranged in any desired combination with respect to the markings contained thereon. If desired the frame and the cards may be of the same color, or they may be of different colors thus enabling the construction of a multi-colored sign.

In making up the sign the cards or tiles 3 are removably and preferably adhesively fastened to the frame. For this purpose I prefer to use some cheap, fragile, readily rupturable or severable means, such, for instance, as the stickers or the gummed strips of paper 5. These gummed paper strips may be similar to those commonly used for binding packages and available in most stores. Preferably the frame 1 is laid face down on a flat surface and the cards 3, also face down, are laid in the opening 2. Strips of the gummed paper 5 are then applied, preferably over the upper and lower ends of the cards so as to secure the cards to the frame. If desired the strips 5 may first be pasted over the upper and lower edges of the opening 2 and then the cards 3 can be pasted on to the exposed portions of the strips. After the sign has served its purpose, the cards 3 may be detached from the frame and the parts can be reused for another sign.

Where the cards 3 are heavy enough and the paper strips 5 are thin enough, removal of the cards may be effected by simply grasping the frame 1 with the hands and forcing the cards either frontwardly or rearwardly with the thumb to rupture the strips 5 and tear them completely or partially away from their adhesive connection with the back of the frame 1. Obviously, however, these strips may be removed with a pair of scissors or by simply grasping the ends of them and tearing them off.

Inasmuch as the cards 3 are wholly devoid of tongues or tabs to support them, they are preferably of fairly stiff, substantial stock, say of the same cardboard stock as the frame 1 and are somewhat similar to tiles in that they are substantially self-sustaining against warping. When the cards 3 are in place they lie substanitially flush with the outer face of the frame. The ornamental border 2 and the spacing of the cards combined with the fact that the securing means are entirely concealed, produce a realistic mosaic or inlaid effect, the numerals appearing on the cards seeming to be inlaid in the face of the frame.

In the modification illustrated in Figs. 5 and 6, the back of the frame is provided with bands of adhesive 6 adjacent the upper and lower edges of the opening 2. In this instance the cards 3 are made somewhat longer than the space between the upper and lower edges of the opening so that they can be affixed at their ends to the bands of adhesive, which bands also serve to properly locate the cards.

Various other modifications in the details of construction herein shown and described may be made without departing from the scope of the invention.

Having thus described my invention, what I claim as new and desire to secure by Letters Patent is as follows:

1. A sign including a body having an opening therein, a plurality of cards fitted in the opening and being disposed in relatively close side by side relation, said cards being each of a length so as to have their end edges substantially abut the adjacent walls resultant from the opening and the outer side edges of the outer cards substantially abut the end walls resultant from the opening, and strip-like means adhesively secured to the back of the body and lapping the ends of each of the cards so as to simultaneously secure all of the cards to the body.

2. A sign comprising a flat, plate-like body having an opening extending entirely therethrough, and a character-bearing tile in the opening and lying substantially flush with the outer face of the body, and concealed means to secure said tile in place.

3. A sign comprising a flat, plate-like body having an opening extending entirely therethrough, a character-bearing tile approximately fitting the opening and lying substantially flush with the outer face of the body and concealed severable means holding said tile in place.

4. A sign comprising a frame having an opening therein and a plurality of character-bearing cards of a length substantially equal to the width of the opening disposed within said opening and adhesive means pasted to the back of said frame and to said cards to hold the latter in place.

5. A sign comprising a frame having an opening therein and a plurality of character-bearing cards of a length substantially equal to the width of the opening, disposed within said opening and an adhesive strip pasted to the back of said frame and to said cards to hold the latter in place, the cards being of substantially the same thickness as the frame whereby they lie flush with the frame when in place.

6. A sign comprising a frame having an opening therein, and a plurality of character-bearing cards of a length substantially equal to the width of the opening, disposed within said opening and rupturable securing means concealed from the front of the frame and holding the cards in place.

7. In a sign a frame having an opening therein, a character-bearing tile arranged within the opening and a sticker pasted to the adjacent rear faces of the frame and tile to secure the latter in place.

8. In a sign a frame having an opening therein, a character-bearing tile arranged within the opening and a sticker pasted to the adjacent rear faces of the frame and tile to secure the latter in place, said tile being of substantially the same thickness as the frame, whereby it lies flush with the outer face thereof.

9. In a sign a frame having an opening therein and bearing a border encircling said opening, a plurality of character bearing cards in the opening, said cards being of a length approximately equal to the width of the opening, spaced slightly apart laterally and lying substantially flush with the face of the frame, whereby with the aid of said frame they simulate inlaid tiles.

10. In a sign a frame having an opening therein and bearing a border encircling said opening, a plurality of character bearing cards in the opening, said cards being of a length approximately equal to the width of the opening, spaced slightly apart laterally and lying substantially flush with the face of the frame, whereby with the aid of said frame they simulate inlaid tiles, and securing means rupturable by a forward or rearward thrust on the cards and serving to hold said cards in place.

11. A method of assembling dismountable price characters in a common frame, where the characters and frame are of a common thickness, which includes the steps of laying the frame face downward on a supporting surface, placing the price character members face downward on said surface within an area enclosed by the walls of an opening in the frame and then pasting an adhesive securing strip to the backs of all the price members and the frame to hold them in assembled relationship.

12. In a sign a plate having an opening therein, a tile fitting the opening in the plate and lying flush therewith, an adhesive strip having its ends pasted to the back of the plate and its intermediate portion pasted to the back of the tile.

HIRAM C. BLOOMINGDALE.